United States Patent
Arisoylu et al.

(10) Patent No.: US 9,647,948 B2
(45) Date of Patent: May 9, 2017

(54) LINK AGGREGATION METHODS AND DEVICES

(71) Applicant: Mushroom Networks, Inc., San Diego, CA (US)

(72) Inventors: Mustafa Arisoylu, San Diego, CA (US); H. Cahit Akin, San Diego, CA (US); Rene L. Cruz, San Diego, CA (US); Rajesh Mishra, San Diego, CA (US)

(73) Assignee: MUSHROOM NETWORKS, INC., San Diego, CA (US)

(*) Notice: Subject to any disclaimer, the term of this patent is extended or adjusted under 35 U.S.C. 154(b) by 380 days.

(21) Appl. No.: 14/172,909

(22) Filed: Feb. 5, 2014

(65) Prior Publication Data

US 2014/0247721 A1    Sep. 4, 2014

Related U.S. Application Data

(63) Continuation of application No. 12/110,241, filed on Apr. 25, 2008, now Pat. No. 8,717,885.
(Continued)

(51) Int. Cl.
*H04L 12/825* (2013.01)
*H04L 12/24* (2006.01)
(Continued)

(52) U.S. Cl.
CPC .......... *H04L 47/25* (2013.01); *H04L 41/0896* (2013.01); *H04L 45/245* (2013.01); *H04L 45/306* (2013.01); *H04L 47/10* (2013.01); *H04L 47/16* (2013.01); *H04L 47/20* (2013.01); *H04L 47/2425* (2013.01); *H04L 47/2441* (2013.01);
(Continued)

(58) Field of Classification Search
CPC ......... H04L 47/25; H04L 47/16; H04L 47/20; H04L 45/306; H04L 45/245; H04L 47/10; H04L 47/2441; H04L 41/0896; H04L 47/41; H04L 47/34; H04L 47/2425; Y02B 60/33
USPC .... 370/229, 230, 231, 235, 351, 389, 395.1, 370/395.2, 395.21, 395.3, 431, 442, 443,
(Continued)

(56) References Cited

U.S. PATENT DOCUMENTS 5,182,550 A    1/1993    Masuda et al.
5,530,700 A    6/1996    Tran et al.
(Continued)

OTHER PUBLICATIONS

International Search Report for PCT/US2008/061684, dated Aug. 27, 2008, 1 page.
(Continued)

*Primary Examiner* — Obaidul Huq
(74) *Attorney, Agent, or Firm* — Gadzinski & Associates, PC

(57) ABSTRACT

A method of aggregating a plurality of packet based communication channels is provided by the system. The communication channels connect two common endpoints, and aggregation devices are present at each endpoint to implement an aggregation policy. The system provides a dynamic aggregation system where m aggregation policy is employed on a per packet flow basis. Packet flows can be classified by application type, so that an appropriate aggregation policy can be used for packets belonging to the flow. The selected aggregation policy is used for each flow within the aggregation devices at each endpoint.

62 Claims, 8 Drawing Sheets

Related U.S. Application Data

(60) Provisional application No. 60/907,989, filed on Apr. 26, 2007.

(51) Int. Cl.
*H04L 12/709* (2013.01)
*H04L 12/725* (2013.01)
*H04L 12/801* (2013.01)
*H04L 12/851* (2013.01)
*H04L 12/891* (2013.01)
*H04L 12/813* (2013.01)

(52) U.S. Cl.
CPC .............. *H04L 47/34* (2013.01); *H04L 47/41* (2013.01); *Y02B 60/33* (2013.01)

(58) Field of Classification Search
USPC ....... 370/444, 464, 480, 485, 486, 487, 489, 370/490, 474, 476
See application file for complete search history.

(56) References Cited

U.S. PATENT DOCUMENTS

| | | | |
|---|---|---|---|
| 6,104,696 A | | 8/2000 | Kadambi et al. |
| 6,252,907 B1 * | | 6/2001 | Hwang .............. H04N 21/2368 348/E5.005 |
| 6,253,247 B1 | | 6/2001 | Datta et al. |
| 6,295,276 B1 | | 9/2001 | Datta et al. |
| 6,490,295 B1 | | 12/2002 | Cooklev et al. |
| 6,493,341 B1 | | 12/2002 | Datta et al. |
| 6,775,235 B2 | | 8/2004 | Datta et al. |
| 6,865,185 B1 | | 3/2005 | Patel et al. |
| 6,910,149 B2 | | 6/2005 | Perloff et al. |
| 7,002,993 B1 | | 2/2006 | Mohaban et al. |
| 7,254,114 B1 * | | 8/2007 | Turner ................. H04L 41/142 370/244 |
| 7,269,143 B2 | | 9/2007 | Datta et al. |
| 7,292,575 B2 | | 11/2007 | Lemieux et al. |
| 7,315,554 B2 | | 1/2008 | Baum et al. |
| 7,406,048 B2 | | 7/2008 | Datta et al. |
| 7,444,506 B1 | | 10/2008 | Datta et al. |
| 8,135,006 B2 * | | 3/2012 | Walter ................ H04L 12/2856 370/389 |
| 2002/0073226 A1 | | 6/2002 | Sridhar et al. |
| 2004/0114518 A1 * | | 6/2004 | MacFaden .......... H04L 41/0816 370/230.1 |
| 2004/0117438 A1 | | 6/2004 | Considine et al. |
| 2004/0136379 A1 | | 7/2004 | Liao et al. |
| 2004/0236855 A1 | | 11/2004 | Peles |
| 2004/0264500 A1 * | | 12/2004 | Bansal ................ H04L 12/5693 370/468 |
| 2005/0091396 A1 | | 4/2005 | Nilakantan et al. |
| 2005/0132062 A1 | | 6/2005 | Halme |
| 2005/0243857 A1 * | | 11/2005 | Hofstaedter ............ H04L 45/04 370/447 |
| 2006/0064492 A1 | | 3/2006 | Hirsch |
| 2006/0084469 A1 | | 4/2006 | Malone et al. |
| 2006/0098573 A1 | | 5/2006 | Beer et al. |
| 2006/0164988 A1 * | | 7/2006 | Mishra .................... H04L 47/10 370/235 |
| 2006/0182034 A1 | | 8/2006 | Klinker et al. |
| 2006/0182103 A1 | | 8/2006 | Martini et al. |
| 2006/0215593 A1 | | 9/2006 | Wang et al. |
| 2006/0262759 A1 * | | 11/2006 | Bahl ................ H04W 72/0406 370/338 |
| 2007/0127424 A1 * | | 6/2007 | Kwon ................... H04L 1/1614 370/338 |
| 2007/0147244 A1 | | 6/2007 | Rasanen |

OTHER PUBLICATIONS

International Preliminary Report on Patentability for PCT/US2008/061684 (1 pg.) dated Oct. 27, 2009, including Written Opinion (4 pgs.) dated Aug. 27, 2008, 5 pages total.
International Search Report for PCT/US2009/48524, dated Dec. 10, 2009, 2 pages.

* cited by examiner

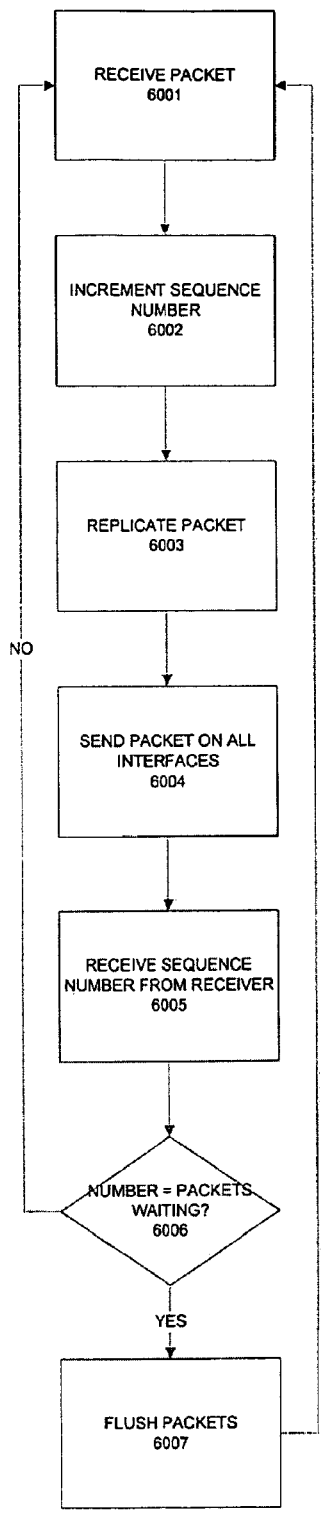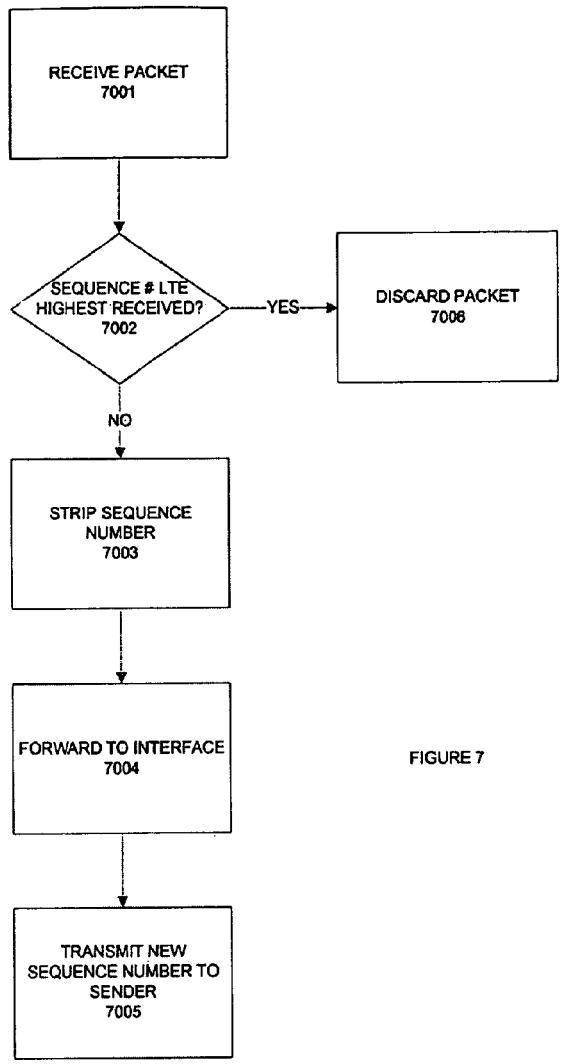
FIGURE 6
FIGURE 7

LINK AGGREGATION METHODS AND DEVICES

This is a continuation of U.S. patent application Ser. No. 12/110,241, filed Apr. 25, 2008, now U.S. Pat. No. 8,717,885, which claims the benefit/priority of U.S. Provisional Patent Application Ser. No. 60/907,989, filed Apr. 26, 2007, all of which are hereby incorporated herein by reference in its entirety.

FIELD

The system relates to the field of network communications, including internet and intranet communications.

BACKGROUND

In order to create a faster and more reliable means of transporting information, a plurality of communication links connecting a common pair of endpoints can be aggregated. This is known as "link aggregation". Link aggregation, or IEEE 802.3ad, is a computer networking term which describes using multiple network cables/ports in parallel to increase the link speed beyond the limits of any one single cable or port, and to increase the redundancy for higher availability.

In digital communications, information is divided into groups of bits called packets. One prior art method of link aggregation is to create a single, virtual, communication link between a pair of endpoints. By virtue of the aggregation, the virtual communication link has more desirable properties than any of the constituent communication links being aggregated. For example, the virtual link can have higher transmission capacity, higher reliability, etc.

Different aggregation policies can be used to construct virtual links, in accordance with desired performance objectives. Generally there are performance tradeoffs involved in selecting a suitable aggregation policy. For example, suppose the performance objective is to maximize the aggregate transmission capacity, of throughput, subject to the constraint of the virtual link serving packets in First-In First-Out (FIFO) order. If the latency suffered by packets on a communication link is variable, then packets may arrive at one endpoint out of order. Thus, a reordering buffer at the remote endpoint is necessary to store packets that arrive out of order until they can leave the virtual link and be delivered in order to the client at the remote endpoint. As the load on the communication links increases, the variability of latency may increase, thereby increasing the delay required to reorder packets at the remote endpoint, and hence increasing the end-to-end latency of the virtual link. Thus there is a tradeoff between maximum throughput of the virtual link and the maximum latency of the virtual link.

Real-time commutations applications may not tolerate such a large latency, and an aggregation policy for the virtual link aimed at maximizing throughput may not be appropriate for such situations. Alternatively, the aggregation policy could be aimed at minimizing latency. For example, one possible approach is to replicate each packet at the local endpoint and send a copy of each packet on each communication link. The purpose of such redundant transmissions is to exploit the fastest communication link. Specifically, the first packet of the set of replicated packets to arrive at the remote endpoint is delivered to the client, and redundant packets subsequently received are discarded at the remote endpoint. If the offered load is sufficiently low, this aggregation policy would yield lower latency than an aggregation policy aimed at maximizing throughput. On the other hand, with this alternate aggregation policy, the maximum throughput is reduced, due to the use of the redundant packet transmissions.

If the set of applications supported on a virtual link have similar requirements, an appropriate aggregation policy may be easily identified. However, if there are some applications to be supported whose requirements (like high throughput) conflict with other applications wife different requirements (like low latency), a sacrifice or compromise must be made in selecting an appropriate aggregation policy. For example, if the link aggregation policy used is aimed at maximizing throughput, then latency sensitive applications may suffer from long latency. Conversely, if the link aggregation policy used employs transmission redundancy to reduce latency, then throughput sensitive supplications may have limited throughput.

In view of the forgoing, there is a need for a method of link aggregation that can more flexibly deal with supported applications that have heterogeneous performance requirements.

SUMMARY OF THE SYSTEM

A method of aggregating a plurality of packet based communication channels is provided by the system. The communication channels connect two common endpoints, and aggregation devices are present at each endpoint to implement an aggregation policy. The system provides a dynamic aggregation system where an aggregation policy is employed on a per packet flaw basis. Packet flows can be classified by application type, so that an appropriate aggregation policy can be used for packets belonging to the flow. The selected aggregation policy is used for each flow within the aggregation devices at each endpoint.

BRIEF DESCRIPTION OF THE DRAWINGS

FIG. 6 is a flow diagram illustrating the operation of a sending side latency scheme in one embodiment.

FIG. 7 is a flow diagram illustrating the operation of a receiver side latency scheme in on embodiment.

DETAILED DESCRIPTION

The system determines an optimal aggregation policy for each packet flow. A packet flow is defined herein as a group of packets that have similar delivery requirements. For example, a packet flow may be data coming from a particular application. The delivery requirements may be a need for high throughput or a need for low latency. The system provides aggregation configuration and policy to meet the needs of the packet flow. This configuration can be changed dynamically depending on the requirements of the packet flow. In some cases, the needs of a packet flow may change mid-stream. In that case, the system is able to reconfigure on the fly to adapt to the changing conditions.

Figure 1:
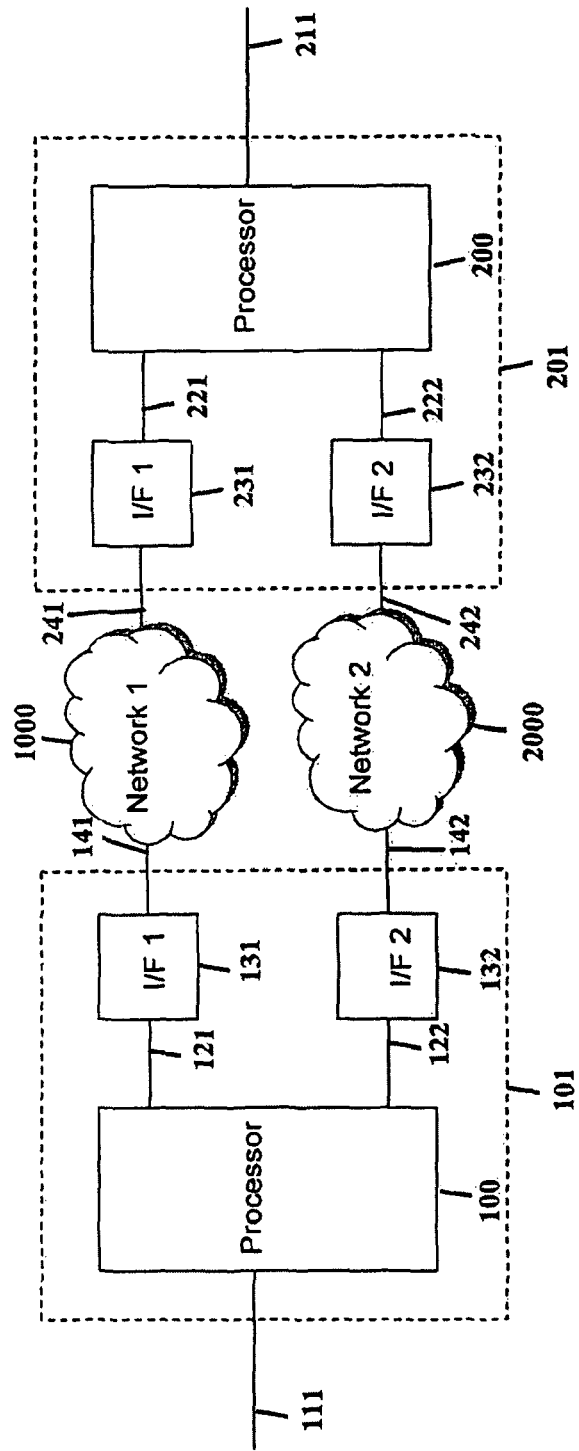
FIG. 1 is an illustration of a two aggregation devices interconnected by two networks.

FIG. 1 is an example system to illustrate the operation of an embodiment. Aggregation devices 101 and 201 are connected to each other through a plurality of networks 1000, 2000. Each aggregation device 101 has a processor 100 for receiving and delivery of packets to a local client through a local interface 111. The processor 100 includes memory resources for storing packets and maintaining state, and has a plurality of network interfaces 121, 122. Each network interface 121, 122 has an associated network driver module 131,132. Each network driver module 131,132 has an associated PHY interface 141, 142. When a processor 100 delivers a packet to a network interface 121, the associated network driver module 131 will deliver the packet through the associated PHY interface 141 for delivery over a network 1000.

Once delivered by the network 1000, the packet will be received by a remote network driver module 231 through a remote PHY interface 241. The remote network driver 231 will deliver the packet through a remote network interface 221 to the remote processor 200 within the remote aggregation device 201. As will be apparent to artisans, these components are defined to describe the system only, and do sot necessarily correspond to hardware components. Indeed, the aggregation devices that implement the methods of this system could be implemented in software.

The local chest could represent a number of possible devices, including a desktop computer, a laptop computer, a PDA, a router, or a switch. A remote client device is attached to the remote interface 211 of the remote aggregation device 201, and could also represent a number of possible devices, including a desktop computer, a laptop computer, a PDA, a router, or a switch.

Each network 1000, 2000 provides a bidirectional communication channel between the aggregation devices 101, 201. For example, the networks could be common and represent the Internet. The networks could also represent dedicated communication channels. As another example, each network 1000, 2000 could represent a wireless local area network. The networks in this case could reside on different frequency bands, and hence non-interfering.

The purpose of the aggregation device 101 is to provide network communications to devices connected on the local interface 111 to devices connected to another aggregation device 201 through a remote interface 211. The communication channels provided by the plurality of networks 1000, 2000 are aggregated together by the aggregation devices 101, 201, and hence the name aggregation device. Various methods of aggregation, targeted towards different objectives, may be used to aggregate the communication channels. The present system discloses a method of aggregation, whereby aggregation policies are applied on a per packet flow basis. In particular, packet flows with different performance objectives, e.g. low latency versus high throughput, can be treated with different aggregation policies.

In FIG. 1, there are only two networks 1000, 2000 that the aggregation devices 101, 102 can use for communication with each other, but it will be clear to artisans how to adapt the description of the system operation of the system if more than two networks are present.

Example Application Scenarios

Before describing the operation of the system, we provide two example applications. In the first example application, called herein the "Internet application," the packer switched networks 1000, 2000 represent the Internet. In this case, the aggregation devices in 101, 201 are separate hardware devices deployed by a business at two locations in order to aggregate two Internet access lines that provide network connectivity between the locations. The local network driver modules 131, 132, 231, 232 may represent wired Ethernet LAN controllers, and the PHY interfaces 141, 142, 241, 242 are wired Ethernet connections to DSL modems that are connected to the Internet. In this example, the latency and the throughput of the communication channels provided by the networks 1000, 2000 could vary significantly over time, due to the unpredictable nature of communication service provided by the Internet.

In another application, herein called the "wireless LAN application," the networks 1000, 2000 represent wireless Local Area Networks (LANs). One aggregation device 101 may be embedded within a laptop computer or a desktop computer, called a client device. In this case, aggregation device may be implemented in software within the client device, and the local interface 121 is a software port within the client. The other aggregation device 201 may be embedded within a wireless LAN router. In this case, the remote aggregation device 201 is implemented in software within, or above, the operating system of the wireless router. In this case, the two wireless networks 1000, 2000, may exist in different frequency hands, so signal crosstalk or interference between the networks may be practically non-existent. However, there may be significant variability in the communication channels in this application, since each of the networks 1000, 2000 may exist in an unlicensed frequency band, and subject to uncontrollable signal interference. This interference could come from devices like microwave ovens, or be interference caused by other devices in the wireless LANs. In this example application, as will be apparent to artisans, the methods of the system may be implemented completely in software within the client and wireless router.

System Operation

The system is able to aggregate the communication channels on a per packet flow basis. A packet flow may be defined in a number of ways according to information bits within the header and payload of the packets belonging to the flow. A common definition of a packet flow in IP networks, for example, is all packets that have a common value for a set of information bits contained in specified bit positions within the packet header or payload, which may contain packet headers for higher layer protocols. For example, in IP networks, all packets that have the same source IP address, destination IP address, protocol number, source port number, and destination port number can be defined as belonging to the same flow. In this system, we do not assume any particular definition of a flow, except that it is a set of packets.

Transmit Side Operations

Figure 2:
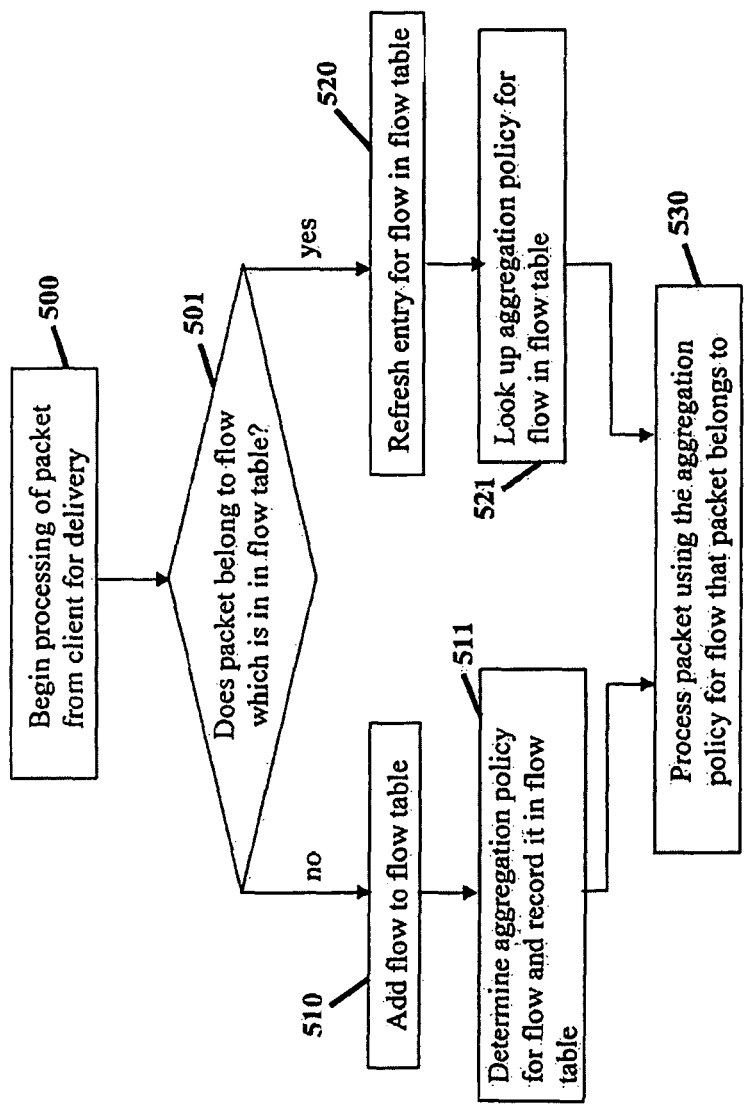
FIG. 2 is a flowchart illustrating the operation of an aggregation device in preparing a packet for delivery in an embodiment of the system.

For purposes of describing the system in more detail, we refer first to FIG. 2, a flow diagram which describes the operation of the aggregation device 101 for processing a packet received on the local interface 111 so that it ultimately gets delivered to the remote interface 211 of a remote aggregation device 201.

Suppose a packet arrives on the local interface 111 for delivery to a remote interface 211. As indicated in the flow chart in FIG. 2, we begin at block 500 where we begin processing of the packet for delivery. At decision block 501, we determine if the packet belongs to a flow for which there is a record in the processor. This is determined by checking whether or not the flow that the packet belongs to is in a flow table (a flow table is maintained within the processor in order to record the identity, and possibly other descriptors, of flows that have been observed by the processor arriving on the local interface 111 in the recent past).

One method of implementing a flow table is with a hash table. With a hash table, the relevant bits of the packet which define a flow are fed to a hash function which determines an index into the hash table. Each entry in the hash table is a pointer to a linked list. The index obtained from the hash function, called the hash value, can thus be used to examine the corresponding entry in the hash table, which points to a linked list where information from the corresponding flow is stored. The linked list will be empty if there are no flows in the table that have the corresponding hash value. The linked list can have more than one entry if multiple flows in the flow table have the same hash value. By examining the linked list corresponding to the hash value, the processor can determine whether or not the packet belongs to a flow that exists in the flow table. Flow tables are commonly used within routers and switches to classify packets belonging to the same flow, so that they can be mated on die basis of flow identity. Transmission priority decisions within switches and routers are also commonly made on the basis of flow identity. In the current system, the flow table is used to select an aggregation policy on the basis of flow identity. Later, the selected aggregation policy is applied to other packets belonging to the same packet flow.

Returning to FIG. 2, at decision block 501, we determine if the packet belongs to a flow that exists In the flow table. If the flow does not exist in the flow table, we move to block 510, where we add the flow to which the packet belongs to the flow table. If the flow table is implemented as a hash table, the corresponding linked list is updated to include an entry for the flow to which the packet belongs. Each entry for a flow in the flow table includes the flow ID, and possibly other descriptors. One possible descriptor is a time stamp value which records the most recent time when a packet from the flow was processed. Other possible descriptors are the total number of packets processed from the flow, and a time average bit rate for the flow. The new entry for the flow in the flow table is created so that the descriptors for fee flow are appropriately initialized.

From block 510, we next proceed to block 511, where we determine an appropriate aggregation policy for the flow to which the packet belongs, and record the chosen aggregation policy as a descriptor for die flow in the flow table. The determination of the appropriate aggregation policy can take many forms. For example, it can be based on protocol and port number in an IP network. Some networking applications use a well known port number for certain types of communication, and thus we can determine art aggregation policy that is appropriate for traffic generated from a specific networking application. For example, web based traffic uses the http protocol, which uses port 80 over the TCP protocol. The ftp file transfer protocol uses port 20 over the TCP protocol. These are examples of applications for which the largest possible throughput is typically desired, and so the aggregation policy can be chosen accordingly. In one embodiment, the selected aggregation policy is one which maximizes throughput.

A secure remote login protocol, SSH, uses port 22 over the TCP protocol. Real-time media streaming applications commonly use the RTSP protocol, which uses port 554 over the UDP and TCP protocols. The Domain Name Service (DNS) protocol uses port 53 over the UDP and TCP protocol. These are examples applications for which low latency is typically desired, and so the aggregation policy can be chosen accordingly.

In general, the Internet Engineering Task Force (IETF) maintains lists of commonly used protocols, and their assigned ports. Here we have only touched on a few common protocols.

In IP networks, besides port numbers, the ToS (type of service) field within the IP packet header can also fee used as the basis for selecting an appropriate aggregation policy for the flow.

The selection of the aggregation policy for the packet flow can also be made on the basis of the state of the entire flow table. Other metrics available to the aggregation device 101 may also fee used as the basis for selection of the aggregation policy. Such metrics include channel quality or congestion level measures, memory and CPU resource availability measures, transmission queue lengths, and feedback from the remote aggregation device 201.

Figure 4:
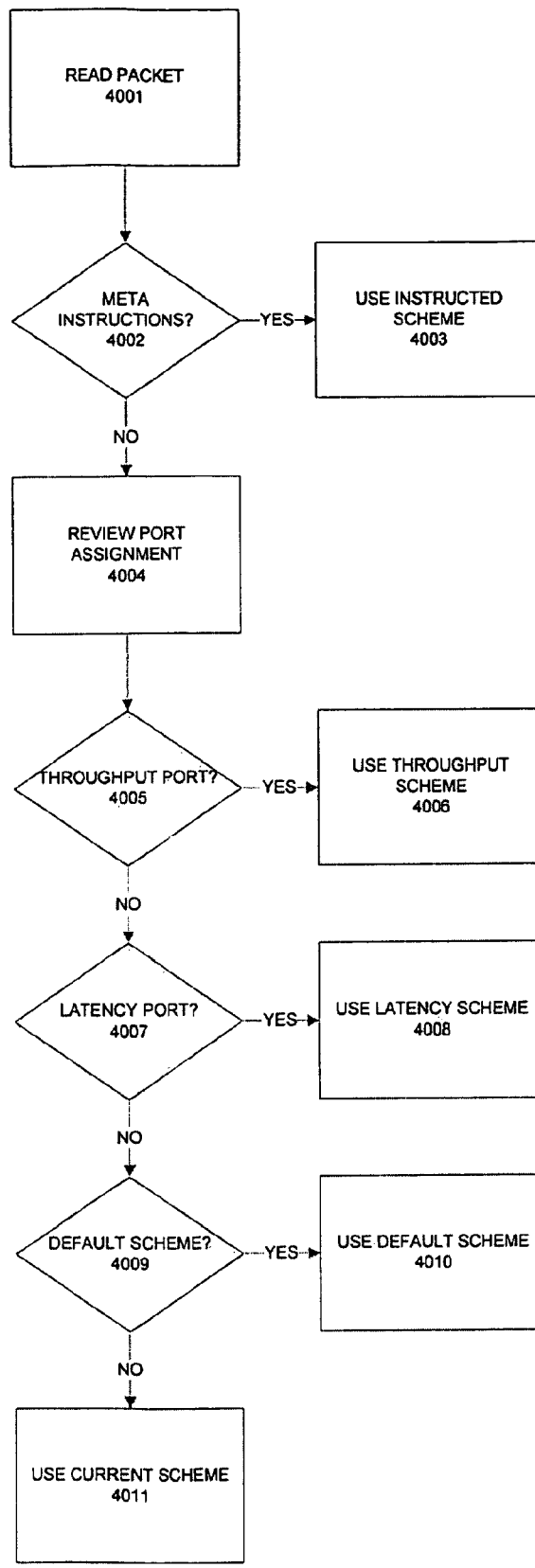
FIG. 4 is a flow diagram illustrating the operation of determining an aggregation policy in one embodiment of the system.

FIG. 4 is a flow diagram illustrating the operation of block 511 in one embodiment of the system. At step 4001 the system reads a packet. At decision block 4002 the system determines if there are meta instructions that indicate the type of aggregation scheme to be used for the packet flow. This may be specific instructions in a header or an indication based on ToS or QoS (quality of service) fields of the packet. In other cases, the size of the file may be indicated. For example, if the flow is an HTTP session, one of the packets from the flow may contain a "Content-Length" header which specifies the size of the object or file to be transferred. The system may use a throughput scheme for all files above a certain size. If there are meta instructions for the packet, the indicated scheme is used at step 4003.

If there are no meta instructions at decision block 4002, the system proceeds to step 4004 and reads the port assignment of the packet. At decision block 4005 it is determined if the port assignment is one that typically requires use of a high throughput aggregation scheme. If so, the throughput scheme is used at step 4005.

If not, the system determines if the port is the type that requires a latency scheme at decision block 4007. If so, a latency scheme is used at step 4008. If not, the system determines if a default scheme is in place at decision block 4009. If so, the default scheme is used at step 4010. If not, the system simply continues using the current aggregation scheme at step 4011. (It should be noted that port ranges can also be used in addition to, or instead of, specific port number assignment. This aids in determining appropriate policy for an application which uses more than one port).

The above flow can also be implemented as ordered rules in a router table. The packet is examined to determine which and how many rules are triggered by the packet. If there are two rules feat are triggered, the higher ordered rule is the controlling rule. The system contemplates allowing the user to define a plurality of rules and ordering them as desired to implement efficient aggregation policies.

In block 511, once an appropriate aggregation policy has been selected, the selected aggregation policy is appended to the newly created entry in the flow table for the flow. This is done so that the appropriate aggregation policy for subsequent packets from the flow can be quickly determined from the flow table. According to the present system, the aggregation policy used for a flow can change dynamically with time. If the aggregation policy does in fact change at a subsequent time, the new-aggregation policy to be used can be updated in the corresponding entry for the flow in the flow table.

Dynamic Policy Assignment

Another method of the system to determine the aggregation policy is an embodiment that maintains a counter for die total volume of traffic sent for each flow, and determines the aggregation policy according the current value of the counter. For example, if the current value is below a threshold, as aggregation policy aimed at reducing latency can be used, and otherwise an aggregation policy aimed at maximizing throughput can be used. Another method of the system maintains a metric that tracks the current data rate for the flow, and determines the aggregation policy according the current value of the metric. Again, for example, if the current value of the metric is below a threshold, an aggregation policy aimed at reducing latency can be used, and otherwise an aggregation policy aimed at maximizing throughput can be used.

Figure 5:
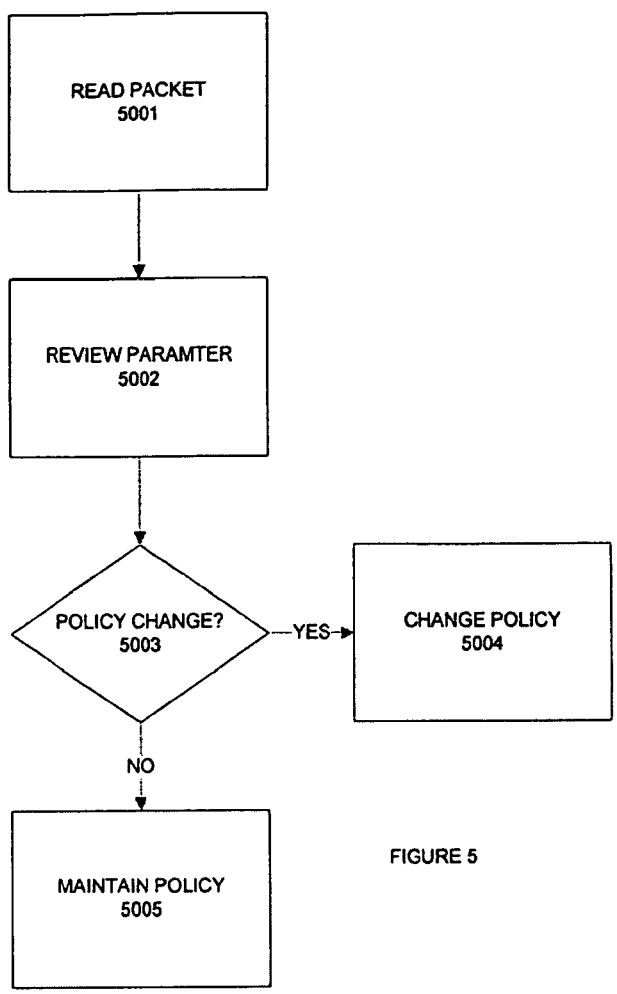
FIG. 5 is a flow diagram illustrating the operation of an embodiment of the system using dynamic policy assignment.

FIG. 5 is a flow diagram illustrating the operation of this embodiment of the system. At step 5001 a new packet is received. At step 5002, the system checks a parameter to determine if change in aggregation policy is needed. This step may consist of checking the counter to see if the threshold count is exceeded, or it may consist of determining if the current data flow rate is above or below a threshold metric.

At decision block 5003 it is determined if the parameter check results in a change of policy. If so, the policy is changed at step 5004. If not, the policy is maintained at step 5005.

Returning to FIG. 2, once an appropriate aggregation policy for the flow is determined and recorded in the flow table in block 511, we move to block 530, and process the packet according to the chosen aggregation policy.

If, on the other hand, at decision block 501 it is determined that the packet belongs to a flow that, is currently in the flow table, we move to block 520, where we update the entry for the corresponding flow in the flow table appropriately. For example, the time stamp value that holds the most recent time when a packet from the flow was processed can be updated with the current time. Other descriptors, for example the count of the total volume of traffic from the flow, or a metric that reflects die current data rate of the flow, can be updated. If the aggregation policy for the flow is allowed to change dynamically depending on such flow descriptors, then in block 520 the current aggregation policy can be updated if necessary in the flow table.

After leaving block 520, we enter block 521, where we look up the aggregation policy used for the flow that the packet belongs to the corresponding entry in the flow table.

After leaving block 521, we move to block 539, and process the packet according to the aggregation policy that has been determined in block 521.

In the background, within the local aggregation device 101, a process to clean oat the flow table of stale entries can be implemented. For example, if a sufficiently long time has elapsed since a packet has been observed from a particular flow, the entry for that flow may be deleted. This can be implemented by checking the time stamp descriptor for each flow in the table, and deleting the flow entry from the table if the current time exceeds the time stamp value for the flow by a certain threshold.

Receive Side Operations

Figure 3:
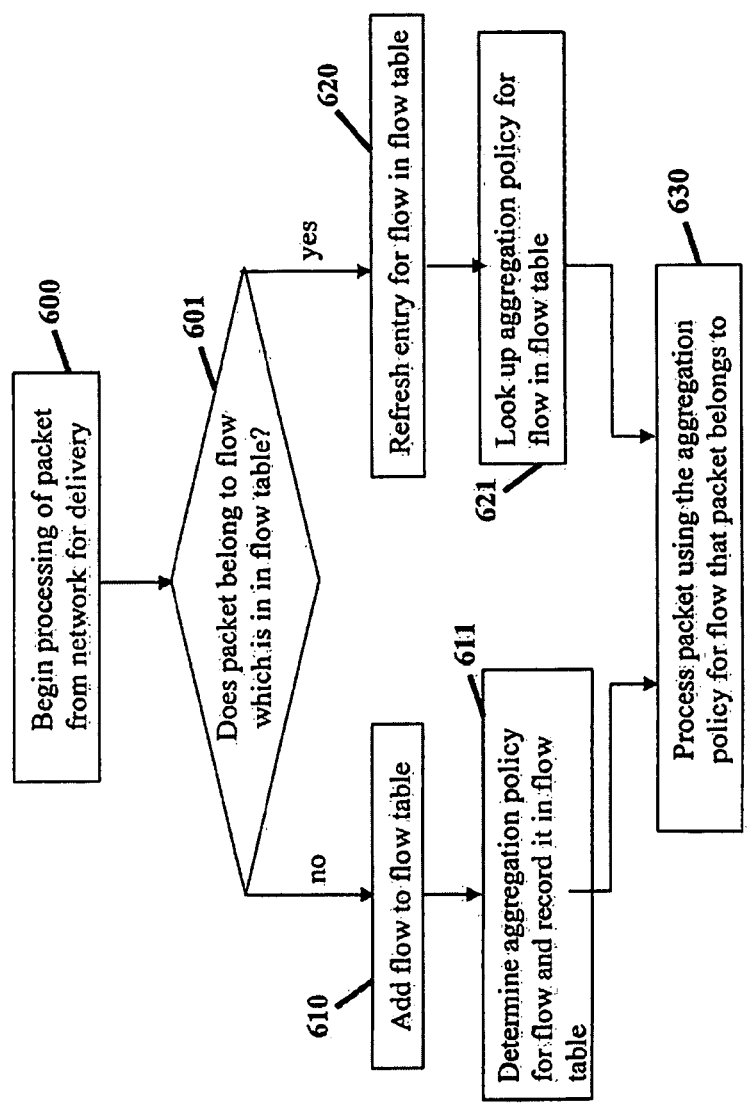
FIG. 3 is a flowchart illustrating the operation of an aggregation device in receiving a packet in m embodiment of the system.

Now we refer to FIG. 3, which describes the operation of the processor 200 within remote aggregation device 201, for processing a packet received on a remote network interface, 221 or 222, so that it ultimately gets delivered to the remote interface 211. As artisans will notice, both the transmit side operations and the receive side operations are implemented in the local aggregation device 101 as well as the remote aggregation device 201. For simplicity of exposition, we only describe the transmit side operations in the local aggregation device 101 and the receive side operations in the remote aggregation device 201.

When a packet arrives from one of the remote network interfaces 221 or 222, the remote processor 200 processes the packet starting in block 600. On the receive side we also have a flow table which is maintain with the same algorithm as used on the transmit side. From block 100, we move to decision block 601, where we check whether or not the packet belongs to a flow which has been recorded in the flow table.

If the packet does not belong to a flow which is recorded in the flow table, we move next to block 610, where we add the flow to the flow table. As on the transmit side, if the flow table is implemented as a hash table, the corresponding linked list is updated to include an entry for fee flow to which the packet belongs. Each entry for a flow in the flow table includes the flow ID, and possibly other descriptors. One possible descriptor is a time stamp value which records the most recent time when a packet feats die flow was processed. Other possible descriptors are the total number of packets processed from the flow, and a time average bit rate for the flow. The new entry for the flow in fee flow table is created so that the descriptors for the flow are appropriately initialized.

From block 610, we next proceed to block 611, where we determine an appropriate aggregation policy for the flow to which the packet belongs, and record the chosen aggregation policy as a descriptor for the flow in the flow liable. The determination of the appropriate aggregation policy is done using the same algorithm as used on the transmit side. Thus packets from the same flow will be classified in the same way on the transmit side and on the receive side. In some embodiments, the local aggregation device 101 may explicitly signal the remote aggregation device as to the aggregation policy to be used for a particular packet flow. This can be accomplished by exchanging policy tables for the different packet flows.

In block 611, once an appropriate aggregation policy has been selected, the selected aggregation policy is appended to the newly created entry in the flow table for the flow. This is done so that the appropriate aggregation policy for subsequent packets from the flow can be quickly determined from the flow table.

Returning to FIG. 3, once an appropriate aggregation policy for the flow is determined and recorded in the flow table in block 611, we then move to block 630, and process the packet according to the chosen aggregation policy.

If, on the other hand, in decision block 601 it is determined that the packet belongs so a flow that is currently in the flow table, we move to block 620, where we update the entry for the corresponding flow appropriately. For example, the time stamp value that holds the most recent time when a packet from the flow was processed can be updated with the current time. Other descriptors tor the flow cast also be updated. If the aggregation policy for fee flow is allowed to change dynamically depending on other flow descriptors, then in block 620 the current aggregation policy can be updated if necessary in the flow table.

After leaving block 620, we enter block 621, where we look up the aggregation policy used for the flow to which the packet belongs in the corresponding entry in the flow table. After leaving block 621, we move to block 630, and process the packet according to the aggregation policy that has been determined in block 631.

As on the transmit side, in the background, within the remote aggregation device 201, a process to clean out the flow table of stale entries can be implemented. For example, if a sufficiently long time has elapsed since a packet has been observed from a particular flow, the entry for that flow may be deleted. This can be implemented by checking the time stamp descriptor for each flow in the table, and deleting the flow entry from the table if the current time exceeds the time stamp value for the flow by a certain threshold.

Aggregation Policies

We now describe several possible aggregation policies. First, we describe aggregation policies aimed at maximizing throughput.

Maximizing Throughput

On the transmit side within an aggregation device 101, each packet from a flow can be forwarded to a selected network interface, 121 or 122. By potentially allowing all the network interfaces to be used for each packet, all of the packets from a given flow can be spread across all networks over time, thereby using all resources available to increase the total throughput. The algorithm to select which network interface should be used to forward a given packet can be made in a number of ways. One method is to explicitly estimate the available transmission capacity on each active link, and make the selection of a network interface in such a way that the total amount of traffic forwarded on a given interface is proportional to the available bandwidth on that interface. For example, if two network interfaces are available and the first has twice the transmission capacity as the second, then the network interface selection will be done in such a way that twice as much traffic from the flow is forwarded over the first interface, relative to the second interface.

Another method of selecting a network interface on the transmit side is the use of backpressure signals. Each network interface may provide feedback to the processor on its ability to accept data for transmission across the respective network. Internally, each network driver module, 131 or 132, may implement an internal transmission buffering mechanism. Packets accepted for transmission are placed into an internal transmission buffer, and transmitted packets are removed from the internal transmission buffer after they have been transmitted. If an infernal transmission buffer reaches capacity, the corresponding network driver module 131 or 132, signals to the processor 100 that the associated network interface is not ready to accept packets for transmission.

The signalling can be explicit or implicit. In the former case, the signaling may take the form of a return code from an attempted transfer operation across the network interface. For example, when we attempt to forward a packet across an interface, we may obtain a "failure" return code, signaling that the operation was not successful due to a full buffer. In any case, we can use the backpressure signals as the basis for selecting a suitable network interface. For example, we can maintain a state variable for the flow indicating the index of the last network interface that was used for the flow. A new packet for forwarding attempts to use the last used network interface, if it is available for forwarding, a packet (i.e. it's transmission buffer is not full). If it is not available, another network interface is used, and the state variable is updated accordingly.

The backpressure signals described above are asserted when the buffer occupancy reaches a certain level. In general, the buffer levels corresponding to assertion of the backpressure signals can be set adaptively according to an estimate of the transmission bandwidth available. In one embodiment, the buffer levels corresponding to assertion of the backpressure signals are proportional to the estimated bandwidth available on the channel that the buffer feeds. This embodiment is such that backpressure signals are asserted when the estimated delay of a packet entering the buffer, until it leaves the local aggregation devise 101, crosses a threshold. In another embodiment that also asserts backpressure signals when the estimated delay of packet crosses a threshold, the estimated delay takes into account the number of packets in the buffer as well as each packets size, and is not based simply the total number of bits in the buffer. In general, by estimating the delay for a packet through each communication channel, we can assign packets to each channel such that the packets will arrive In order at the remote aggregation device 201 if the delay of each packet is equal to the estimated delay. This will make the reordering process at the remote aggregation device more efficient.

For aggregation policies aimed at maximizing throughput on the transmit side if may be appropriate to pre-pend or append overhead information to each packet sent on the channel. Such, overhead information can include sequence numbers. The sequence numbers can be used on the receive side for reordering packets, if necessary or desired. For some flow types, such as TCP, the underlying protocol may already include sequence numbers which, can be used by the aggregation policy, removing the need for additional overhead information to be inserted.

For the receive side processing for a given packet flow with an aggregation policy aimed at maximizing throughput, the remote aggregation device may reorder packets so that they are presented to the remote interface 211 in substantially the same order as they were presented to the local interface 111. This can be accomplished using sequence numbers that are added as overhead information, as described above. If a packet is received for which the sequence number is strictly greater than that of the last packet delivered to the remote interface 211, then the processor 200 may store the packet in a buffer so that packets with sequence numbers less than that of the current packet received can be delivered to the remote interface before the current packet. In order to prevent deadlock from lost packets that never arrive, a timer can be implemented so that packets buffered longer than a threshold are delivered to the remote interface out of order. Often, throughput sensitive applications use the TCP protocol. The performance of the TCP protocol can be adversely affected by out of order delivery. Thus, by reordering packets so that they arrive in order most of the time, the throughput performance of a TCP connection can be improved with sack an aggregation policy.

If the end-to-end protocol used supports out of order delivery of packets, or if packets arrive in order most of the time, the receive side processing does not need to reorder packets on the receiving side. All that needs to be done in this case is to discard the overhead information, if any, that was added to the packet, and deliver the packet to the remote interface 211. Regardless of whether or not reordering is applied at the receiving end, if overhead information was added to the packet, then that overhead is removed before delivering packets to the remote interface 211.

Reducing Latency

For latency sensitive applications, it may be desirable to have an aggregation policy aimed at reducing latency. For example, one aggregation policy aimed at reducing latency is as follows. On the sending side, the local aggregation device 101 replicates packets received on the local interface 111 and sends the same packet over a plurality of network interfaces 121, 122. In order to recognize packets, sequence numbers can be sent as additional overhead information in each packet. On the receiving side, the remote aggregation device discards duplicate packets received, strips off the overhead information that was added on fee sending side, if any, and forwards the packets to the remote interface 211.

In order to detect duplicate packets, the remote aggregation device can simply keep a record of the sequence number of the packet that was most recently delivered to the remote interface 211. If a packet is received with a sequence number that is less than or equal to the recorded sequence number of the packet most recently forwarded, then the received packet is discarded. If a packet is received with a sequence number that is greater than the recorded sequence number of the packet most recently forwarded, then the received packet is forwarded to the remote interface 211 after stripping off the overhead information added at the sending side. As an additional optimization, the receiving side can periodically send the recorded sequence number, of the packet that was most recently delivered to the remote interface 211, to the sending side. The sending side can then flush packets not already sent but already received by the remote aggregation device.

The operation of this latency scheme on the sending side is illustrated in FIG. 6. At step 6001 the sender receives the next packet to be sent. At step 6002, the sender increments the sequence number of the packet, adds the sequence number to the packet, and replicates the packet at step 6003. At step 6004 the sender sends the packet on all available interfaces.

At step 6005 the sender receives a sequence number from the receiver. This is an optional step where the receiver periodically sends the highest sequence number successfully received by the receiver. At step 6006 the sender checks the sequence number against packets waiting to be sent. If the sequence number is the same, the sender flushes those matching packets because they do not need to be sent and returns to step 6001. If the sequence number is different, the sender returns to step 6001.

FIG. 7 illustrates the operation at the receiver side. At step 7001, the receiver receives a packet from the sender. At step 7002 the receiver cheeks to see if the sequence number of the packet is less than or equal to the highest sequence number already received. If so, the packet is discarded at step 7006. If not, the receiver, strips the sequence number from the packet at step 7003 and forwards it to the interface at step 7004. At step 7005 the receiver optionally transmits the new highest received sequence number to the sender.

The scheme above uses redundant packet transmissions in an effort to reduce latency. This scheme may be used for a real-time application that is sensitive to latency. However, such applications may also generate traffic in large bursts that need to be quickly delivered from the local aggregation device to the remote aggregation device. As a result, the local aggregation device may be forced to queue large amounts of data for the flow. In this case, a dynamic transmission redundancy scheme can be used.

Suppose a packet with L bits is received by the local aggregation devise 101 on the local interface 111. The packet may actually be a frame, which consists of a set of two or more packets from the flow queue. Thus, L may be large relative to the maximum number of bits that are allowed to be transmitted in a packet over each network interface. It is instructive to consider first an ideal model where, the L bits are mapped to an infinite sequence of fixed length packets, say P1, P2, P3, etc, known as a "zero rate" code. An example would be use of an LT (Luby Transform) code. The mapping is such that the original L bits can be reconstructed from any set of M packets from the sequence. The value of M is such that the total size of M all packets, in units of bits, is equal to L. On the sending side, in the case where two network interfaces are available, the local aggregation device sends packets P1, P3, P5, P7, etc, from the sequence on the first network interface, and concurrently sends packets P2, P4, P6, etc. from the sequence on the second network interface. On the receiving side, the remote aggregation device stores the incoming packets from the sequence. After M packets from the sequence have arrived, the receiving side sends an acknowledgement message to the sender indicating M packets have been received, and reconstructs the original L bits presented at the local interface 111. These L bits are then delivered as a packet or a frame to the remote interface 211, as the case may be. All packets are labeled with a sequence number, which could refer to a frame. Packets that arrive at the remote aggregation device after the first M packets arrive are discarded by the testate aggregation device. The sequence numbers are used to distinguish packets belonging to the same frame. When the sending side receives an acknowledgement message from the receiving side, it flushes all packets in the buffer from the sequence that have not already been sent, and moves to processing the next packet or frame received on the local interface 111, as the case may be, and the sequence number will advance.

In the case where packets are grouped into frames, each frame may contain overhead information that allows the receiving side to disassemble the frame into the constituent packets that made up the frame at the ideal aggregation device. Conceptually, frames are conveyed as a unit from the local aggregation device to the remote aggregation device. The size of a frame may be variable.

Figure 8:
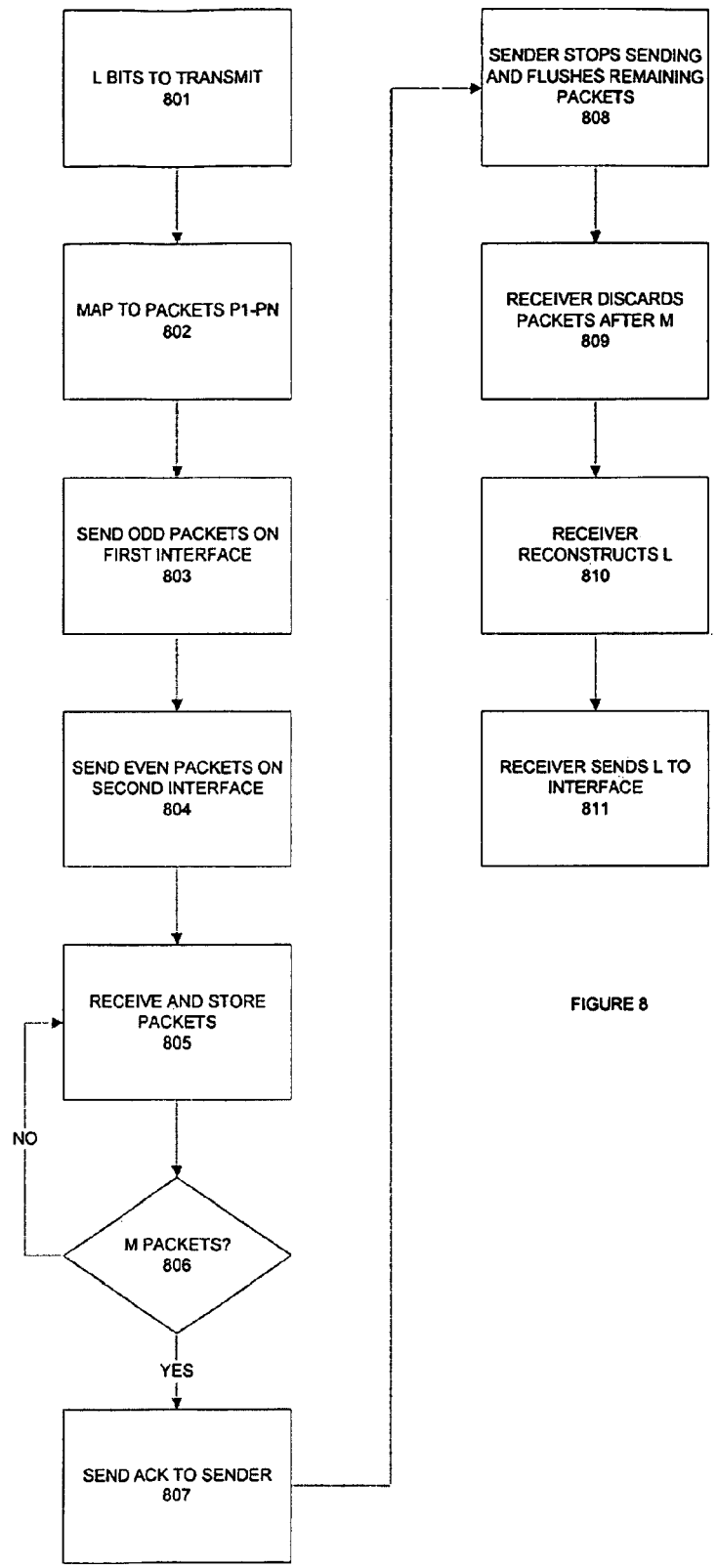
FIG. 8 is a flow diagram illustrating the operation of the system in transmitting a frame of L bits in one embodiment.

The operation of the system in this embodiment is illustrated in FIG. 8. At step 801 the sender is provided with L bits to transmit. As noted above, these bits may be part of a frame and the number of bits may exceed the allowed bits per packet in the system. At step 802 the packets are mapped to a number of packets P1 to Pn. The mapping is such that any M packets can be used to reconstruct L. At steps 803 and 804 the odd packets are send on the first interface and the even packets are sent on the second interface. This is by way of example only. The packet assignment can be done in any fashion in a two interface system. In addition, more man two interfaces can be utilized in the system.

At step 805 the receiver receives and stores the packets. At step 806 the receiver determines if M packets have been received. If not, the receiver continues receiving packets at step 805. If so, the receiver sends an ACK to the sender at step 807. At step 808 the sender stops sending packets from that set off L bits and flushes remaining packets. At step 809 the receiver discards any packets in excess of M packets. At step 810 the receiver reconstructs L using the M packets. At step 811 the receiver sends L to the local interface.

Figure 9:
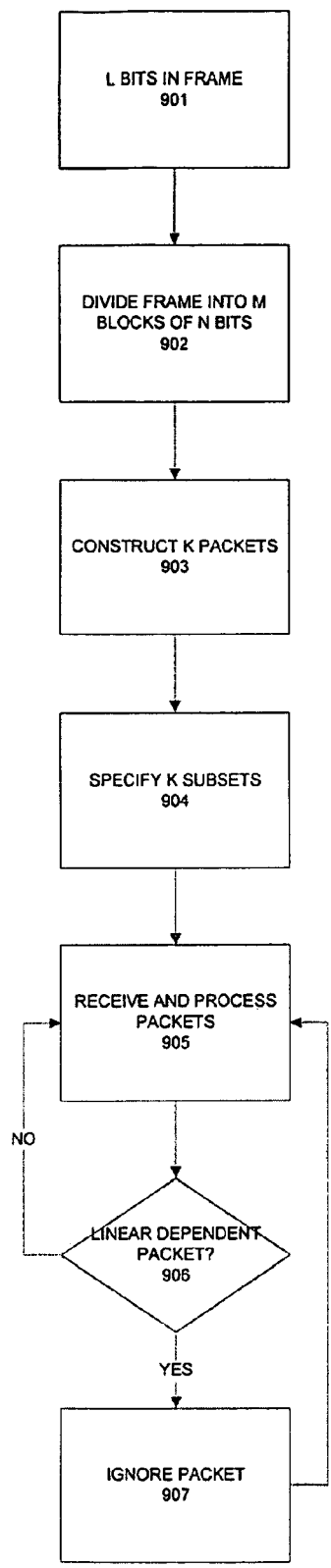
FIG. 9 is a flow diagram illustrating the operation of the system in transmitting a frame of L bits in another embodiment.

We had first considered an ideal model where an infinite sequence of packets was generated such that any M packets can be used to reconstruct the original L bits in the frame. We now discuss a specific implementation that is described in the flow diagram of FIG. 9. At step 901, we again receive L bits in a frame for transmission. At step 902, each frame is divided into fixed length blocks. Each block consists of N bits, for some integer N. The blocks are labeled with indices. For concreteness, suppose there are M blocks in a frame, indexed from 1 to M. Thus there are L=MN bits total in the frame. Typically, N will be approximately the same size as a packet to be sent over a network interface, and will be fixed. Thus, if the frame size is variable, it is the parameter M that will vary.

When a frame of M blocks-arrives, at step 903 we construct a finite number K of packets. These K packets are partitioned into sets of size $K_1$ and $K_2$ such that $K_1+K_2=K$. The packets from the first set are sent over the first interface, and the packets from the second set are sent over the second interface. As noted previously, this example is for a two interface system. The solution can be applied to systems with more than two interfaces.

Each packet contains a bit-wise modulo-2 sum of a subset of the blocks of the frame, as well as an identifier which specifies the particular subset. For example if $B_1$ represents the bits in the first block of the frame, $B_2$ represents the bits in the second block in the frame, etc, then as an example the packet might contain the hit sequence $B_2+B_7+B_9$, as well as an identifier that specifies the subset $\{2,7,9\}$.

In order to generate the K packets, we need to specify K different subsets of the M indices at step 904. In general the K subsets may be chosen carefully or according to some specific criteria. In one embodiment, the K subsets are chosen randomly among all subsets of a given cardinality W. For example, W=4 or W=5. In essence, each packet contains a linear equation in terms of the variables $B_1, B_2, B_3, \ldots, B_M$. If we consider M such equations chosen randomly, then if the equations are linearly independents they can be solved to yield the unknowns $B_1, B_2, B_3, \ldots, B_M$. In general, if we consider M packets, the parity equations they represent may not be linearly independent, and additional packets containing equations that are linearly independent of the previous equations received may be necessary in order to solve for the unknowns $B_1, B_2, B_3, \ldots, B_M$. However, in practice, the number of additional packets required is a small number and is often zero.

The received packets can fee processed sequentially at the remote aggregation device at step 905, in order to iteratively solve the equations for $B_1, B_2, B_3, \ldots, B_M$. Gaussian elimination is a well known method to solve linear systems of equations, and can be used. If at any point, a received packet contains an equation feat was linearly dependent on the equations from the earlier packets, then this condition is detected at step 906 by the algorithm and the received packet is effectively ignored at step 907. Typically, however, M packets are sufficient to determine all the bits in a frame. Additional arriving packets can be processed at the remote aggregation device, as available, if the blocks $B_1, B_2, B_3, \ldots, B_M$ are not-determined after processing M packets.

Consider the following example of operation, which is similar to the packet duplication scheme discussed earlier. In this example of operation, $K_1=M$ and $K_2=M$, so that even if the remote aggregation device receives only the packets from one network interface, it can reconstruct the frame. The parity equations may seed to be chosen in this case to guarantee that M equations from only one Interface are linearly independent. In this example of operation, there is a factor of two redundancy in fee sense feat a frame is M blocks and the total number of blocks sent on each network is M. This will in general limit the maximum throughput of the flow to the maximum throughput available on any one network interface.

This motivates other possible modes of operation, which are less aggressive in terms of redundant packets but have larger maximum throughputs. Indeed, as artisans will notice, the amount of redundancy can be traded off with the maximum throughput. Increased redundancy will generally have the potential to reduce system latency, as it will overcome the problems introduced by uncertainty in the performance available on each network. As an example, if the two network interfaces are known to have the same throughput, we can choose $K_1=K_2=0.5$ M, and the system will achieve an optimal maximum throughput of twice feat of either network. However, the system latency might be reduced significantly if redundant packets were sent, which would happen if we set $K_1$ and $K_2$ to, say, 0.6 M instead of 0.5M. In the example discussed previously, we considered the extreme case where $K_1=M$ and $K_2=M$, but values of $K_1$ and $K_2$ even larger than M may be desired to circumvent packet loss on each network interface. The amount of redundancy used may vary dynamically during the lifetime of a flow, in the sense that the aggregation policy is parameterized by $K_1$ and $K_2$ and these parameters are allowed to change during the lifetime of a flow in order to tradeoff latency reduction and system capacity.

Hybrid Latency Reduction and Throughput Maximization

For some packet flows, it may not be immediately clear how to choose an aggregation policy. For example, some Voice over IP network applications intentionally disguise traffic to evade detection by network operators, making it difficult to appropriately classify such traffic to choose an appropriate aggregation policy. In order to address this problem, we can select a latency reducing aggregation policy by default. The volume or rate of flow for the packet flow can then be measured, and if one of the metrics measured exceeds a threshold, the packet flow can be reassigned to an aggregation policy which maximizes throughput. This hybrid mechanism is also appropriate for certain types of world wide web traffic. Alternatively, a parameterized aggregation policy can be used, and the parameters are initially set to favor latency redaction. The parameters of the aggregation policy can be adapted with time in accordance with measured metrics following the approach described in FIG. 5, for example.

Half Duplex Communication Channels

In the Wireless LAN application scenario, it is common that the communication channels provided by the connecting networks 1000, 2000 operate in a half-duplex mode, i.e. transmission and reception of packets cannot occur simultaneously. During a file transfer, acknowledgements sent by the receiver to the sending side can consume significant network resources. In this case, it may be desirable to use one of the networks 1000, 2000 for forwarding the contents of the file from the local aggregation device 101 to the remote aggregation device 201, and use another network for forwarding acknowledgements from the remote aggregation device 201 to the local aggregation device 101. In order to implement this, one of the network interfaces is chosen for the flow by the local, aggregation device 101 for forwarding all traffic from the flow. At the time the first packet from a flow is processed, in addition to creating a flow entry for traffic in the forward direction, a corresponding entry for the flow in the opposite direction is created as well, where the flow in the opposite direction will use a different network. In the case where multiple networks, different from the network used for transporting traffic in the forward direction, are available for transporting acknowledgements in the reverse direction, a metric for selecting one such network for forwarding an acknowledgement can be used. Alternatively, multiple networks can simultaneously transport redundant acknowledgements.

One feature of transporting all traffic of a flow over a single network and using a different network or networks for transporting acknowledgements in fee reverse direction is that fee remote aggregation device will not need to reorder packets, assuming feat each network transports packets in first-in first-out order, as is common. This feature can be significant if processor resources at the remote aggregation device are limited.

Transport protocols, such as TCP, often use frequent acknowledgements sent from the receiving side to the transmitting side. As a further optimization, the remote aggregation device may selectively discard acknowledgement packets to save transmission resources, and hence increase throughput. One possible embodiment is as follows. For the first acknowledgement packet received by the remote aggregation device 201 over the remote interface 211, the processor 200 will store the acknowledgement packet in a buffer and start a timer initialized to zero. Subsequent acknowledgement packets received for the follow over the remote interface 201 will also be buffered, as long as the value of fee timer is below a threshold. When the timer value crosses the threshold, all acknowledgements except the most recent are discarded, and the most recent acknowledgement is sent back to the local aggregation device. Since the most recent acknowledgement is cumulative, it contains the same relevant information as the most recent acknowledgement. After the timer crosses the threshold, the process repeats. The advantage of this scheme is that less transmission resources are used for transporting acknowledgements.

Combined Aggregation Assignment

In one embodiment, where there are three or more networks for communication, the system contemplates a scheme where some subset of the networks are used for throughput and the remainder is used for latency policy. This network assignment can be implemented for a single packet flow as desired. That is, a single packet flow could have some of its packets being sent on the throughput network(s) (using the throughput policy) and others being sent on the latency network(s) (using the latency policy). The policy assignment of these networks can be changed dynamically as desired or switched entirely to one policy or the other depending on performance.

While specific embodiments of the present system have been shown and described, it should be understood that other modifications, substitutions and alternatives are apparent to one of ordinary skill in the art. Such modifications, substitutions and alternatives can be made without departing from the spirit and scope of the system, which should be determined from the appended claims.

Various features of the system are set forth in the appended claims.

The invention claimed is:

1. A method of transmitting data, comprising:
accepting L bits for transmission;
mapping the L bits to n packets;
sending a first subset of n packets on a first interface;
sending a second subset of n packets on a second interface;
receiving the packets at a receiver;
sending an ACK from the receiver to the sender when M packets are received;
reconstructing L bits from the M packets;
dynamically selecting a first aggregation policy for a first set of packets from a first packet flow that arrive on a first communication interface for delivery to the receiver;
dynamically selecting a second aggregation policy for a second set of packets from the first packet flow that arrive on the first communication interface for delivery to the receiver; and
dynamically applying the said selected aggregation policies for traffic that belongs to a single communication session, over a plurality of communication channels.

2. The method of claim 1, wherein the dynamically selected first aggregation policy is dependent on the first packet flow.

3. The method of claim 1, wherein said second aggregation policy selection is dependent on one or more dynamic characteristics of a counter or a metric of the first packet flow.

4. The method of claim 1, wherein the selection of the first aggregation policy and/or the second aggregation policy is also dependent on conditions of the network.

5. The method of claim 1, wherein selection of one or more aggregation policies is implemented via use of ordered rules in a router table.

6. The method of claim 1, wherein rules for selection of aggregation policies are configurable in that a user may define at least one rule and order the rules as desired to implement efficient aggregation policies.

7. The method of claim 6, wherein the rules comprise determining if there are meta instructions including processing specific instructions in a header or an indication based on ToS (type of service) or QoS (quality of service) fields of a packet.

8. The method of claim 6, wherein the rules comprise determining if there are meta instructions including processing size information regarding an object or file in a packet.

9. The method of claim 1, wherein rules for selection of aggregation policies comprise reading port assignment information, the port assignment information including specific port number assignments and/or port ranges.

10. The method of claim 1, wherein selection of one or more aggregation policies is implemented via use of a metric dependent on acknowledgement packets.

11. The method of claim 1, wherein the dynamic selection of the first aggregation policy and/or the second aggregation policy includes changing the aggregation policy midstream as a function of the counter or the metric compared to a threshold.

12. The method of claim 1, wherein the aggregation policy selected by the dynamic selection includes a coding algorithm.

13. The method of claim 12, wherein the coding algorithm includes replication coding.

14. The method of claim 1, wherein the dynamic selection of the first aggregation policy and/or the second aggregation policy includes selection of an aggregation policy as a function of back-pressure signals.

15. A method of transmitting a frame of data, comprising:
accepting L bits in a frame for transmission;
dividing the frame into M blocks of N bits;
constructing K packets of data from the M blocks;
transmitting one of a plurality of subsets of K packets on each of a plurality of interfaces;

receiving and processing the packets at a receiver;
dynamically selecting a first aggregation policy for a first set of packets from a first packet flow that arrive on a first communication interface for delivery to the receiver;
dynamically selecting a second aggregation policy for a second set of packets from the first packet flow that arrive on the first communication interface for delivery to the receiver; and
dynamically applying the said selected aggregation policies for traffic that belongs to a single communication session, over a plurality of communication channels.

16. The method of claim 15, wherein the dynamically selected first aggregation policy is dependent on the first packet flow.

17. The method of claim 15, wherein said second aggregation policy selection is dependent on one or more dynamic characteristics of a counter or a metric of the first packet flow.

18. The method of claim 15, wherein the selection of the first aggregation policy and/or the second aggregation policy is also dependent on conditions of the network.

19. The method of claim 15, wherein selection of one or more aggregation policies is implemented via use of ordered rules in a router table.

20. The method of claim 15, wherein rules for selection of aggregation policies are configurable in that a user may define at least one rule and order the rules as desired to implement efficient aggregation policies.

21. The method of claim 20, wherein the rules comprise determining if there are meta instructions including processing specific instructions in a header or an indication based on ToS (type of service) or QoS (quality of service) fields of a packet.

22. The method of claim 20, wherein the rules comprise determining if there are meta instructions including processing size information regarding an object or file in a packet.

23. The method of claim 15, wherein rules for selection of aggregation policies comprise reading port assignment information, the port assignment information including specific port number assignments and/or port ranges.

24. The method of claim 15, wherein selection of one or more aggregation policies is implemented via use of a metric dependent on acknowledgement packets.

25. The method of claim 15, wherein the dynamic selection of the first aggregation policy and/or the second aggregation policy includes changing the aggregation policy midstream as a function of the counter or the metric compared to a threshold.

26. The method of claim 15, wherein the aggregation policy selected by the dynamic selection includes a coding algorithm.

27. The method of claim 26, wherein the coding algorithm includes replication coding.

28. The method of claim 15, wherein the dynamic selection of the first aggregation policy and/or the second aggregation policy includes selection of an aggregation policy as a function of back-pressure signals.

29. A method of transmitting data comprising:
accepting L bits for transmission;
mapping the L bits to n packets;
sending a first subset of n packets on a first interface over a first network;
sending a second subset of n packets on a second interface over a second network;
receiving the packets at a receiver via the first network and the second network;
sending an ACK from the receiver to the sender when M packets are received;
reconstructing L bits from the M packets;
wherein a first packet comprises the L bits;
replicating the first packet into the first subset and the second subset;
incrementing a sequence number associated with a packet;
receiving a return sequence number from a receiver; and
flushing the first subset and the second subset when the return sequence number is equal to the sequence number.

30. A method of transmitting data comprising:
accepting L bits for transmission;
mapping the L bits to n packets;
sending a first subset of n packets on a first interface over a first network;
sending a second subset of n packets on a second interface over a second network;
receiving the packets at a receiver via the first network and the second network;
sending an ACK from the receiver to the sender when M packets are received;
reconstructing L bits from the M packets;
receiving one or more replicated packets at the receiver;
comparing a sequence number to a highest received sequence number;
discarding packets when the sequence number is less than or equal to the highest received sequence number; and
stripping the sequence number when the sequence number is greater than the received sequence number.

31. A method of transmitting a frame of data comprising:
accepting L bits in a frame for transmission;
dividing the frame into M blocks of N bits;
constructing K packets of data from the M blocks;
transmitting one of a plurality of subsets of K packets on each of a plurality of interfaces;
receiving and processing the packets at a receiver;
wherein a first packet comprises the L bits;
replicating the first packet into the first subset and the second subset;
incrementing a sequence number associated with the packet;
receiving a return sequence number from a receiver; and
flushing the first subset and the second subset when the return sequence number is equal to the sequence number.

32. The method of claim 31, further comprising setting parameters for packet transmission including selection of: values for L, M and N, an algorithm for constructing K packets, and the subsets of K packets to be sent over the plurality of interfaces.

33. The method of claim 32, further comprising:
applying an aggregation policy to an incoming stream of bits from a flow to split the bits into L sized frames; and
repeating the aggregation policy for frame after frame until the flow ends.

34. The method of claim 31, further comprising employing an aggregation policy on a per packet flow basis.

35. The method of claim 34, wherein the aggregation policy comprises setting parameters for packet transmission including selection of: values for L, M and N, an algorithm for constructing K packets, and the subsets of K packets to be sent over the plurality of interfaces.

36. The method of claim 35, further comprising:
applying the aggregation policy to an incoming stream of bits from a flow to split the bits into L sized frames; and repeating the aggregation policy for frame after frame until the flow ends.

37. The method of claim 34, wherein packet flows are classified by flow type, and wherein a designated aggregation policy is utilized as a function of the flow type.

38. The method of claim 37, wherein the designated aggregation policy is used for each flow within aggregation devices at each endpoint.

39. The method of claim 37, wherein the designated aggregation policy is determined as a function of application type of the packet flow.

40. The method of claim 37, wherein the designated aggregation policy is determined as a function of a counter or a metric of the packet flow.

41. The method of claim 37, wherein the designated aggregation policy is determined as a function of conditions of the network.

42. The method of claim 37, wherein the designated aggregation policy is determined as a function of ordered rules in a router table.

43. The method of claim 37, wherein rules for designation of aggregation policies are configurable in that a user may define at least one rule and order the rules as desired to implement efficient aggregation policies.

44. The method of claim 31, further comprising:
sending an ACK from the receiver to the sender when M packets are received.

45. The method of claim 31, further comprising:
dynamically adjusting an aggregation policy of a flow over time.

46. The method of claim 31, further comprising setting aggregation policy for various flows as a function of one or more characteristics of the flow.

47. A method of transmitting a frame of data comprising:
accepting L bits in a frame for transmission;
dividing the frame into M blocks of N bits;
constructing K packets of data from the M blocks;
transmitting one of a plurality of subsets of K packets on each of a plurality of interfaces;
receiving and processing the packets at a receiver;
receiving one or more replicated packets at the receiver;
comparing a sequence number to a highest received sequence number;
discarding packets when the sequence number is less than or equal to the highest received sequence number; and
stripping the sequence number when the sequence number is greater than the received sequence number.

48. The method of claim 47, further comprising setting parameters for packet transmission including selection of: values for L, M and N, an algorithm for constructing K packets, and the subsets of K packets to be sent over the plurality of interfaces.

49. The method of claim 48, further comprising:
applying an aggregation policy to an incoming stream of bits from a flow to split the bits into L sized frames; and
repeating the aggregation policy for frame after frame until the flow ends.

50. The method of claim 47, further comprising employing an aggregation policy on a per packet flow basis.

51. The method of claim 50, wherein the aggregation policy comprises setting parameters for packet transmission including selection of: values for L, M and N, an algorithm for constructing K packets, and the subsets of K packets to be sent over the plurality of interfaces.

52. The method of claim 51, further comprising:
applying the aggregation policy to an incoming stream of bits from a flow to split the bits into L sized frames; and
repeating the aggregation policy for frame after frame until the flow ends.

53. The method of claim 50, wherein packet flows are classified by flow type, and wherein a designated aggregation policy is utilized as a function of the flow type.

54. The method of claim 53, wherein the designated aggregation policy is used for each flow within aggregation devices at each endpoint.

55. The method of claim 53, wherein the designated aggregation policy is determined as a function of application type of the packet flow.

56. The method of claim 53, wherein the designated aggregation policy is determined as a function of a counter or a metric of the packet flow.

57. The method of claim 53, wherein the designated aggregation policy is determined as a function of conditions of the network.

58. The method of claim 53, wherein the designated aggregation policy is determined as a function of ordered rules in a router table.

59. The method of claim 53, wherein rules for designation of aggregation policies are configurable in that a user may define at least one rule and order the rules as desired to implement efficient aggregation policies.

60. The method of claim 47, further comprising:
sending an ACK from the receiver to the sender when M packets are received.

61. The method of claim 47, further comprising:
dynamically adjusting an aggregation policy of a flow over time.

62. The method of claim 47, further comprising setting aggregation policy for various flows as a function of one or more characteristics of the flow.

* * * * *

UNITED STATES PATENT AND TRADEMARK OFFICE
CERTIFICATE OF CORRECTION

PATENT NO. : 9,647,948 B2
APPLICATION NO. : 14/172909
DATED : May 9, 2017
INVENTOR(S) : Mustafa Arisoylu et al.

Page 1 of 1

It is certified that error appears in the above-identified patent and that said Letters Patent is hereby corrected as shown below:

On the Title Page

Currently reads ((57) ABSTRACT):
"A method of aggregating a plurality of packet based communication channels is provided by the system. The communication channels connect two common endpoints, and aggregation devices are present at each endpoint to implement an aggregation policy. The system provides a dynamic aggregation system where m aggregation policy is employed on a per packet flow basis. Packet flows can be classified by application type, so that an appropriate aggregation policy can be used for packets belonging to the flow. The selected aggregation policy is used for each flow within the aggregation devices at each endpoint."

Should read:
-- A method of aggregating a plurality of packet based communication channels is provided by the system. The communication channels connect two common endpoints, and aggregation devices are present at each endpoint to implement an aggregation policy. The system provides a dynamic aggregation system where an aggregation policy is employed on a per packet flow basis. Packet flows can be classified by application type, so that an appropriate aggregation policy can be used for packets belonging to the flow. The selected aggregation policy is used for each flow within the aggregation devices at each endpoint. --

Signed and Sealed this
Twenty-second Day of August, 2017

Joseph Matal
*Performing the Functions and Duties of the
Under Secretary of Commerce for Intellectual Property and
Director of the United States Patent and Trademark Office*